Feb. 24, 1931.  H. T. COOKE  1,793,680
MOTOR VEHICLE SIDE PROTECTOR AND SPRING BUMPER GUARD
Filed July 16, 1929    2 Sheets-Sheet 1
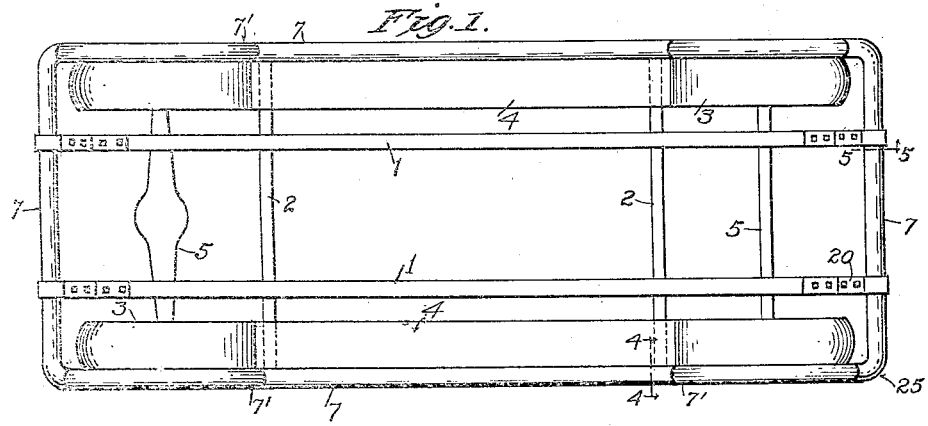
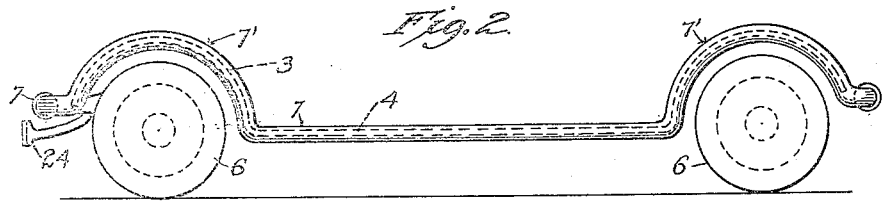
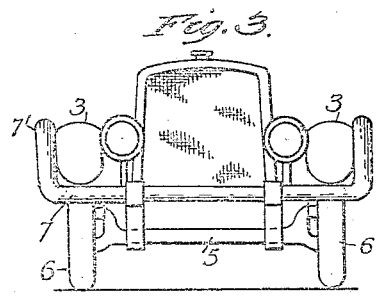
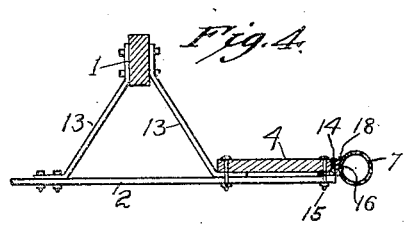
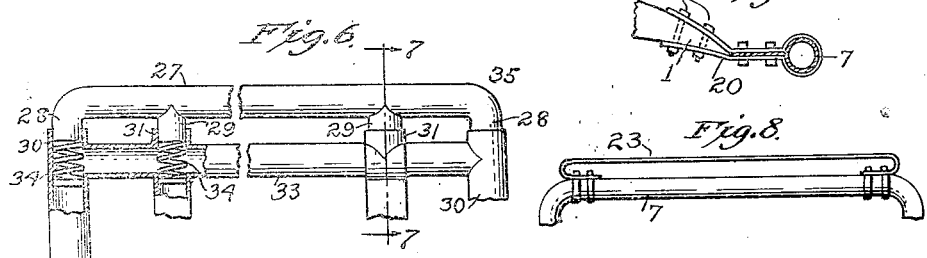
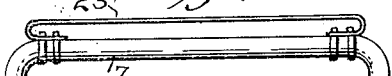
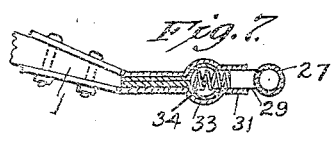
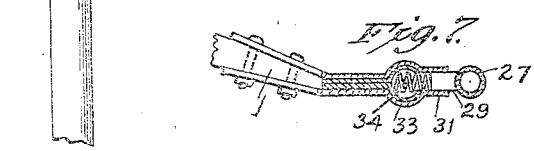
INVENTOR.
Harry T. Cooke,
BY Arthur P. Knight &
Alfred W. Knight
ATTORNEYS.

Feb. 24, 1931. H. T. COOKE 1,793,680
MOTOR VEHICLE SIDE PROTECTOR AND SPRING BUMPER GUARD
Filed July 16, 1929 2 Sheets-Sheet 2
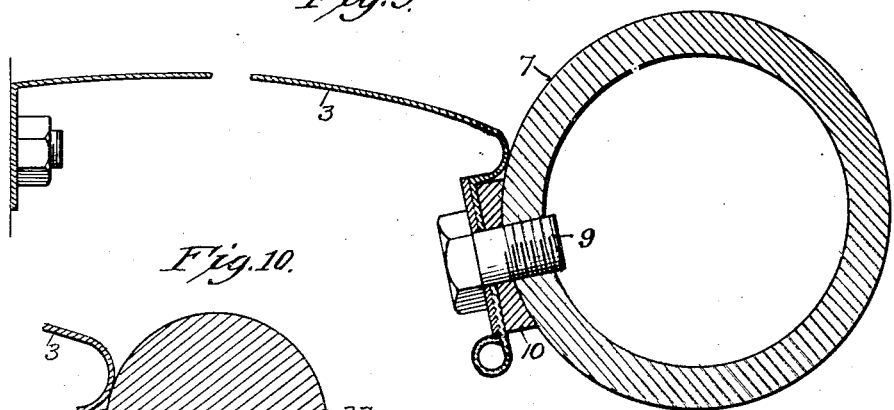
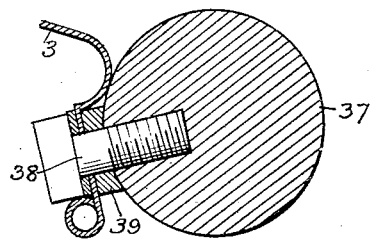
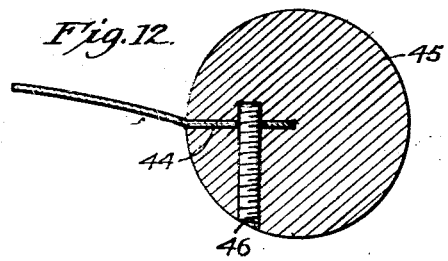
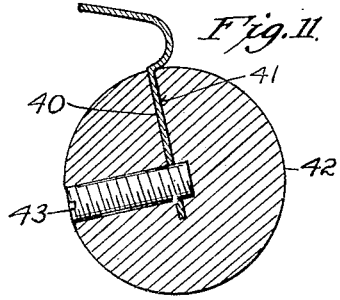
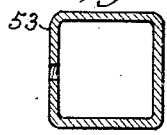
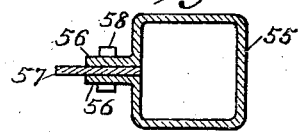
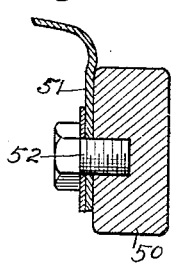
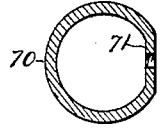
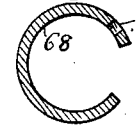
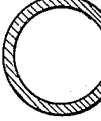
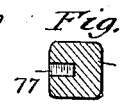
INVENTOR.
Harry T. Cooke,
BY Arthur P. Knight
Alfred W. Knight
ATTORNEYS Patented Feb. 24, 1931

1,793,680

UNITED STATES PATENT OFFICE

HARRY T. COOKE, OF LOS ANGELES, CALIFORNIA

MOTOR-VEHICLE-SIDE PROTECTOR AND SPRING-BUMPER GUARD

Application filed July 16, 1929. Serial No. 378,673.

This invention relates to means for protecting motor vehicles from effects of collision and for deflecting as far as possible any contacting body so as to minimize the damage to a motor vehicle from such contact and for preventing entanglement of two motor vehicles with each other.

The main object of the present invention is to provide means which will protect or guard an automobile from injurious contact at either side, or at front or rear. The bumpers now in general use give a considerable degree of protection at the front and rear of the machine, but they afford no protection from contacts at the side. For this reason fenders and running boards are especially liable to damage by side contacts and where front and rear spring bumpers are used they generally leave the fenders exposed to corner contact as well as to side contact. This is especially the case where a contacting car is provided with bumpers which are liable to "hook" in between the wheels, fenders and bumpers of another car. My present invention provides means whereby any such injurious contacts are prevented and particularly to means whereby the fenders and running boards, as well as the other projecting parts of the car, are fully protected and guarded from injurious contact with another car or other object and whereby entanglement of two cars is prevented.

The invention consists essentially of a frame formed as a rub rail or rub guard member of substantially rigid construction and extending completely along each side of a car and around the car in such manner as not to interfere with the movement of the car or access to the wheels while at the same time presenting an effective guard for the fenders and running boards of the car as well as providing a rigid bumper at the front and rear of the car. This rigid bumper in front and rear may be used to support the ordinary spring bumper or it may be used as an additional bumper for taking up the shock in cases where the elastic capacity of the ordinary spring bumper is exhausted.

The accompanying drawings illustrate embodiments of my invention and referring thereto:

Fig. 1 is a plan view of the protector and deflector guard rail in position on the frame of an automobile, the drawing showing the frame bars and fenders, but the automobile body being omitted.

Fig. 2 is a side elevation showing the relation of the protector frame to the automobile wheels.

Fig. 3 is a front elevation of an automobile provided with my improved protector and deflector guard rail.

Fig. 4 is a section on line 4—4 in Fig. 1.

Fig. 5 is a section on line 5—5 in Fig. 1.

Fig. 6 is a vertical section showing the adaptation of my invention in connection with the support of a spring bumper.

Fig. 7 is a section on line 7—7 in Fig. 6.

Fig. 8 is a plan view showing the manner in which a bumper may be attached to the protecting means.

Fig. 9 is a vertical section of the protector and deflector frame and a portion of a fender showing the manner in which the device is attached to the fender.

Figs. 10 to 13 inclusive are vertical sections showing modified forms of the protector and deflector frame and the manner of fastening the same to the fender.

Figs. 14 to 21 inclusive show other modified forms of cross section of the device.

In Fig. 1 I have shown a portion of an automobile body frame comprising longitudinal bars 1 and cross bars 2, the body of the automobile being omitted, and said figure also shows the fenders 3 and running boards 4 which are understood to be attached to the automobile body in the usual manner. The body frame is mounted in the usual manner on the chassis by which the frame is supported on the axles 5 and wheels 6.

My invention comprises a rub frame or rub rail 7, preferably formed as a continuous rounded smooth member consisting of longitudinal portions adapted to extend alongside the vehicle body, and transverse portions adapted to extend in front and rear of the vehicle body and forming a frame which is substantially rectangular in horizontal extension, so as to completely surround an automobile body and extend alongside and fasten close to the fenders and running boards at each side and in front and rear to the sills or longitudinal bars 1 of the automobile body. The member 7 is constructed of steel or other sufficiently hard and rigid material, able to withstand the shocks of ordinary collision or contact without denting or bending. In order to secure the necessary strength without undue weight, I prefer to make this rail member 7 of hollow form or tubing as shown in Fig. 9, and it is also preferred to make this hollow member or tubing of sufficient size, say from 1½ to 4 inches outside diameter (or even larger for large trucks) so as to provide a rigid surface of relatively large diameter which is rounded and adapted to withstand the effects of collision, but minimize damage to other machines with which it comes in contact by its large round non-entangling smooth surface. In order to provide for requisite rigidity, the member 7, if tubular, should have a wall thickness not less than ⅛ inch for 2 inch tubing and correspondingly more for larger tubing. The protecting rail member may be constructed in any suitable manner. For example, it may be formed of two steel tubes bent in U-shape, and fastened together so that the joints come at the mid-widths of the front and rear of the car, the joint being made by welding, riveting or otherwise for strength and continuity.

The side portions of the member 7 extend alongside the respective fenders and running boards, being bent or arched upwardly in a vertical plane adjacent each end as shown at 7', to conform substantially to the curvature of the fenders, so that it protects the fenders and running boards while allowing free move of and access to the wheels of the car and without increasing materially the effective width of the car. In order to properly protect the fenders, the member 7 preferably extends somewhat above the top edge of the fenders and somewhat below the bottom edge thereof as shown in Figs. 9 and 12.

The member 7 may be mounted on the automobile body in any suitable manner, but is preferably attached to the sills of the body frame at the front and rear thereof, to the fenders or to the running board at the sides of the automobile body or to any two of said parts or to all of them. In case the member 7 is attached to the fenders, the construction shown in Fig. 9 may be adopted, comprising bolts 9 passing through holes in the fenders 3 and secured to the member 7. A washer indicated at 10 is provided between the members 3 and 7, said washer having surfaces conforming to said members so as to give a firm seat for the guard rail member 7. Any other suitable means for fastening the guard rail or protecting frame to the fenders may, however, be employed, for example as hereinafter described.

The guard rail or protecting frame may be attached to the body frame in any suitable manner, for example, at the sides of the frame, it may be connected as shown in Fig. 4, the running boards 4 being shown as mounted on cross bars 2 which are suspended from and rigidly connected to the body frame member 1 by straps 13, and the guard rail 7 being rigidly mounted on these cross bars 2. For this purpose an angle iron 14 may be secured by bolts 15 to the bar 2 and running board 4, and bolt 16 may extend through said angle iron and screw into holes in the tubular rail 7 so as to secure said rail to the angle iron. A washer 18 may be provided between the parts 14 and 7, said washer having surfaces conforming to said parts so as to give a suitable bearing for rigid support of member 7 on member 14.

As shown in Figs. 1 and 5, the guard rail member 7 may be connected at its transverse portions at front and rear of the machine to the body frame member 1 by means of straps 20 which extend around the rail member 7 and are secured to the member 1 by bolts 21. It will be understood, however, that any other suitable means for mounting the guard rail or protecting frame 7 on the body frame of the vehicle may be used.

The guard rail or protecting frame 7, while substantially rectangular in horizontal extension is preferably rounded at the corners as shown at 25 so as to minimize the liability of catching or hooking on other machines and to aid in the function of the same member 7 as a deflecting means. For this purpose the longitudinal portions and the transverse portions of the frame 7 are connected by curved portions 25. This construction also protects the spring bumpers from catching or hooking onto another bumper, thus closing the open corners of the car so equipped. This prevents the equipped car from getting locked from behind the bumper of a car not so equipped and of course two cars so equipped would easily slip away from each other without entanglement.

In case spring bumpers are attached to the vehicle body, as shown at 24 in Fig. 2, the rigid frame 7 may act as a stop for taking the shock of collision when the resiliency of the spring bumper is exhausted.

In case it is desired to attach spring bumpers to the protecting means, the same may be attached directly to the transverse front and rear portions of the guard rail 7 as shown at 23 in Fig. 8. If desired, the spring bumper may be built in as part of the frame shown in Figs. 6 and 7, the bumper, indicated at 27, being formed as a tubular member similar in dimension to the guard rail member 7 and having portions 28 and 29 extending longitudinally of the machine and sliding in tubular portions 30 and 31 on the guard rail member 7 and on cross bar or member 33. In this case the longitudinal bars 32 and cross bars 33 are rigidly connected and constitute the protecting frame proper, the member 27 constituting an extension or bumper on said frame which is normally held in extended position by means of springs 34 within the tubular portions 30 and 31 aforesaid, but is adapted to yield in case of collision. With this construction, the rounded portions at the corners of the frame are provided on the extension member or bumper 27 as shown at 35.

As shown in Figs. 10, to 13, a solid rail may be used instead of the tubular rail shown in Fig. 9. In the form shown in Fig. 10, the solid rail indicated at 37 is secured to the fender indicated at 3 by means of a screw 38 extending through the fender and through a washer 39 and screwing into the rail 37, or as shown in Fig. 11, the apron of the fender indicated at 40 may extend in a slit 41 in the guard rail member 42 and be fastened by a screw 43. In order to more effectively protect the fender from rubbing as in overriding or underriding, a portion of the fender may be formed with a horizontal edge portion as shown at 44 in Fig. 12, the construction being otherwise as shown in Fig. 11, the guard rail 45 being secured to the fender portion 44 by screw 46. As shown in Figs. 9, 10 and 12, the guard rail is preferably of larger diameter than the depth of the fenders and running boards and extends above and below the fenders and running boards so as to protect the same from the effects of overriding and underriding.

While the guard rail is preferably round so as to minimize the liability of injury and entanglement on collision it may, however, be of any other desired shape, for example, rectangular as shown at 50 in Fig. 13, being for example secured to the apron 51 of the fender by screw 52 as shown, and such rectangular rail may be solid as shown in Fig. 13 or hollow as shown at 53 in Fig. 14, this figure also showing the protecting member as square in cross section.

As shown in Fig. 15, the guard rail or protecting member indicated at 55 may be provided with flanges or lugs 56 whereby it may be attached to a fender apron or other support, indicated at 57, by means of bolts 58. A similar construction may be used in connection with a round tubular guard rail member such as shown at 60 in Fig. 19, such member having in that case flanges or projections 61 secured by bolts 62 to a suitable support 63 in rigid connection with the automobile body frame. Fig. 18 shows a similar construction in which the guard rail member 65 is provided with only one attaching flange 66 and in cross section does not form a complete circle.

Fig. 17 shows an embodiment of the invention in which the guard rail member indicated at 68 does not form a complete tube, being open along one side and being provided with apertures 69 for securing it to a fender or other suitable support as in the form shown in Fig. 9.

Fig. 16 shows a form of the invention in which the guard rail member is tubular as indicated at 70, but is flattened at one side so as to provide an effective bearing on a flat supporting surface, such as a fender apron.

Fig. 20 shows a similar shape of guard rail member 73 of solid construction and flattened at one side as shown at 74 and provided with a tapped opening 75 for receiving a fastening screw, it being understood that the flat surface 74 is placed against the fender apron or other support and the member 73 is secured to said support by a suitable screw.

Fig. 21 shows a similar construction embodying a square guard rail indicated at 76 provided with a tapped hole 77 for securing it to a suitable support, and with rounded edges as shown.

The protecting and deflecting means above described constitutes, in its preferred form, a strong rub tube of metal made into the form of a continuous frame, shaped to conform to the most projecting parts of a motor vehicle and extending around the vehicle and fastened to such projecting parts so that it becomes rigid with the chassis and body of the car. With such a construction nothing approaching the vehicle can do it contact injury, but would first come in contact or have to touch this strong protective frame. When once installed it needs no further attention, protecting the car constantly, either moving or standing. This device gives free access at all times to tires and wheels, as there are no bolts to remove or hinges to work.

This protector and deflector frame has a suitably tempered hard surface, designed not to show injury at point of contact, but deflect it and allow it to slip, slide, or rub along and off and away without appreciable injury. Its shape is preferably round so that another car cannot hook onto its fenders; its surface is smooth and continuous along the entire length of the car's two sides, thus also protecting the runningboards, and it has rounded corners where it crosses the front and rear of the car to be joined as one piece with the opposite side. By crossing closely inside of the spring bumper both front and rear, it closes the "open corners" of the car, thus acting as a spring bumper protector also, for by doing this another car cannot get behind the back end of the bumper to hook onto it. Thus the uses of this "safety first" device are multiplied.

It will be noted that this device adds but its own diameter of from one and one-half to four inches in its various sizes to the width of the car at each side and does not extend the full length of the car, but is short of such length by the depression extent of the spring bumper.

This frame is rounded in cross section to prevent hooking of another car, and smooth, so that two cars can slide along their entire length and not do injury, and when parking in a diagonal position the "open corners" are closed by this frame and the spring-bumper is protected from its weakest point, that of rear contact. It is brought close (in a vertical line) inside the spring bumper so that when the spring action of the spring bumper has been expended it cooperates with the spring bumper in acting as a solid bumper, front and rear. Thus it protects the car on all four sides and helps the spring bumper also.

Its action is to receive the injurious contact at the point of impact, and the action is as follows:—The hard frame resists or deflects the attacking object, (usually another car) leaving no impression of the contact on the frame, (unless the collision is severe enough as in end-on-to-side collision to upset the car itself it might bend the frame by the car's weight), but transmitting the impact to the entire protective frame, and through it to the chassis and then the impact is finally absorbed by the air in the rubber tires that are contacting the road, which is the only perfect contact that the automobile could make. Thus we have finally rubber and air cushioning and absorption. It is correct to have rubber and air for final absorption, but not at the point of contact, as the point of contact must be unimpressionable, hard and resistant. But even so this first contact surface, while it has been designed for satisfactory self-protection, it has been so designed when forced to receive the contact of another car that the other car may slip off of its round smooth surface, or travel in contact with the protective frame until it passes off at the end of the frame without injury to the frame or little if any injury to itself. Thus it is a "safety first device" for its own protection, and a deflector to allow the other car to slip away without appreciable injury.

I claim:

1. A collision guard for automobiles consisting of a continuous tubular metal frame adapted to entirely surround the automobile, said frame being rectangular in plan and having side portions adapted to lie at the sides of the automobile and end portions adapted to extend across the automobile respectively in front of and to the rear of said automobile, said side members being arched upwardly adjacent each end to conform substantially to the curvature of the fenders, and said frame being provided with means for rigid attachment to the sides of the automobile.

2. A collision guard for automobiles consisting of a continuous tubular metal frame adapted to entirely surround the automobile, said frame being rectangular in plan and having side portions adapted to lie at the sides of the automobile and end portions adapted to extend across the automobile respectively in front of and to the rear of said automobile, said side members being arched upwardly adjacent each end to conform substantially to the curvature of the fenders and being provided with means for rigid attachment to the sides of the automobile, and yieldable shock absorbing members supported by said frame respectively in front of the front end portion and at the rear of the rear end portion.

3. A collision guard for automobiles consisting of a continuous tubular metal frame adapted to entirely surround the automobile, said frame being rectangular in plan and having side portions adapted to lie at the sides of the automobile and end portions adapted to extend across the automobile respectively in front of and to the rear of said automobile, said side members being arched upwardly adjacent each end to conform substantially to the curvature of the fenders and being provided with means for rigid attachment to the sides of the automobile, tubular extensions on said frame extending forwardly of the front end portion and rearwardly of the rear end portion, a bar extending across each end portion of the frame and having portions extending telescopically into said tubular extensions, and compression springs within said tubular extensions and bearing against the telescopic portions respectively of the bar.

In testimony whereof I have hereunto subscribed my name this 10th day of July, 1929.

HARRY T. COOKE.